United States Patent [19]

Kortovich et al.

[11] Patent Number: 4,534,951
[45] Date of Patent: Aug. 13, 1985

[54] MANUFACTURE OF HIGH QUALITY GRAPHITE ELECTRODES USING CALCINED ANTHRACITE COAL AS RAW MATERIAL

[75] Inventors: James W. Kortovich, Strongsville; Eugene Micinski, Parma, both of Ohio

[73] Assignee: Union Carbide Corporation, Danbury, Conn.

[21] Appl. No.: 552,734

[22] Filed: Nov. 17, 1983

Related U.S. Application Data

[63] Continuation-in-part of Ser. No. 322,238, Nov. 17, 1981, abandoned, which is a continuation of Ser. No. 133,751, Mar. 25, 1980, abandoned.

[51] Int. Cl.³ ............................................. C01B 31/04
[52] U.S. Cl. .................................... 423/448; 252/502; 423/445; 423/449
[58] Field of Search ...................... 423/448, 449, 445; 264/29.1, 29.5; 252/502

[56] References Cited

U.S. PATENT DOCUMENTS

| 1,317,497 | 9/1910 | Hinckley | 252/502 |
| 3,001,237 | 9/1961 | Balaguer | 264/29.1 |
| 3,421,991 | 1/1969 | Hildebrandt | 264/29.1 |

FOREIGN PATENT DOCUMENTS 1510568  5/1978  United Kingdom ................ 423/448

OTHER PUBLICATIONS

Ryss et al. "Electrometallurgy" Dec. 1968, pp. 1031–1033.
Letizia, J. American Carbon Conference, 10th Biennial Conference on Carbon, Jun. 27, 1971, p. 113.

*Primary Examiner*—Edward J. Meros
*Attorney, Agent, or Firm*—John R. Doherty

[57] ABSTRACT

Calcined anthracite coal particles are substituted for petroleum coke in the manufacture of high quality graphite electrodes.

3 Claims, 3 Drawing Figures

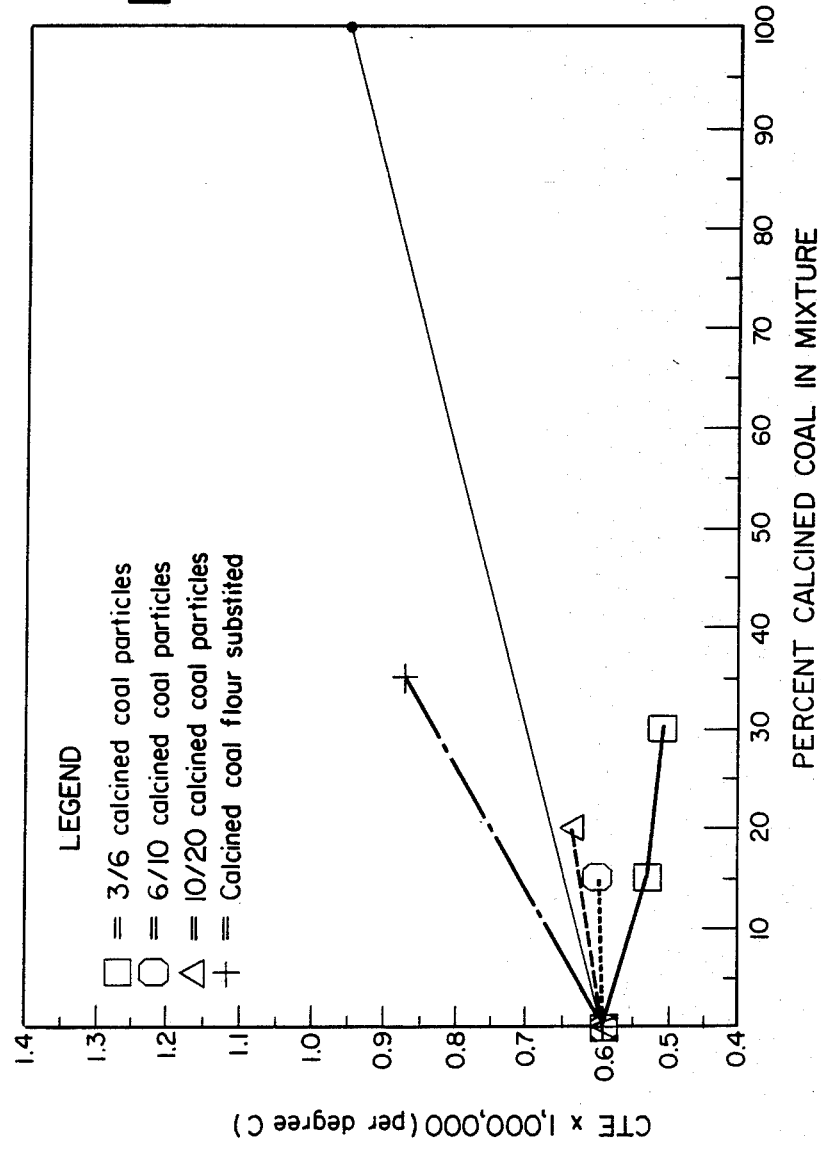

MANUFACTURE OF HIGH QUALITY GRAPHITE ELECTRODES USING CALCINED ANTHRACITE COAL AS RAW MATERIAL

This application is a continuation-in-part of our earlier application Ser. No. 322,238, filed Nov. 17, 1981, now abandoned, which in turn is a continuation of an earlier application Ser. No. 133,751, filed Mar. 25, 1980, now abandoned.

BACKGROUND

The present invention relates to the manufacture of high quality graphite electrodes for use in electric arc furnaces.

Graphite electrodes for use in electric arc furnaces are conventionally made by shaping a mixture containing a carbonaceous filler material such as petroleum coke and a binder such as coal tar pitch to the form of the desired electrode and then baking the electrode at high carbonizing temperatures. The electrode is then graphitized at elevated temperatures of at least 2500° C.

The quality of graphite electrodes so produced is mainly dependent upon the type of raw materials that are employed. Graphite electrodes capable of superior performance can usually be made by incorporating into the electrode mixture a premium petroleum coke as a filler material. These electrodes exhibit a low electrical resistivity and a low coefficient of thermal expansion (CTE) and also possess a high flexural strength. Unfortunately, the cost of manufacturing these electrodes has risen dramatically over the past few years due mainly to the increased cost and at times reduced availability of premium petroleum cokes. There is therefore a growing need in the industry to develop improved methods for manufacturing graphite electrodes using lower cost and more plentiful raw materials.

It has already been proposed to replace part of the premium petroleum coke used in the manufacture of high quality graphite electrodes with lower cost carbonaceous materials such as, for example, regular petroleum cokes, metallurgical coke or previously baked or graphitized carbonaceous materials. However, these proposals have not met with satisfactory results primarily because electrodes made with these substitute materials exhibit high CTE values and, in some cases, a low flexural strength.

Although coal particles have been occasionally found in minute amounts in graphite electrodes, they have been regarded as an undesirable contaminant and, consequently, the use of coal in any amounts as a raw material in the manufacture of graphite electrodes has been avoided. Coal flours of less than 100 mesh size have been evaluated experimentally as a raw material but the test results indicated intolerable CTE values of two to four times that obtained for premium cokes.

SUMMARY OF THE INVENTION

It has been surprisingly found in accordance with the present invention that calcined anthracite coal can be substituted for premium petroleum coke ordinarily used in electrode mixes for making high quality graphite electrodes while at the same time lowering the coefficient of thermal expansion (CTE) of the finish electrodes if the amount of calcined coal used in the mix does not exceed about 30% by weight of the total filler material and provided further that relatively large size coal particles are employed. It has been found, for example, that when calcined anthracite coal particles of about 3/6 mesh (i.e., 100% of the particles pass through a No. 3 Tyler sieve while none pass through a No. 6 Tyler sieve) were substituted for the premium petroleum coke particles of approximately the same size in an amount up to about 30% by weight of the total filler material, values of with-grain CTE were obtained which were lower than those of electrodes made with all petroleum coke.

It is therefore an important object of the present invention to provide a novel high quality graphite electrode for use in electric arc furnaces.

Another object of the present invention is to provide such a novel high quality graphite electrode which can be made using low cost, readily available raw materials as a substitute for petroleum coke ordinarily employed in the manufacture of such electrodes.

A more specific object of the present invention is to provide such a novel high quality graphite electrode which can be made using inexpensive, readily available coals as a substitute for premium petroleum coke filler materials while at the same time enhancing important electrode properties such as the coefficient of thermal expansion (CTE).

As used herein and in the appended claims, the term "premium petroleum coke" means a coke having a CTE value of about $1.0 \times 10^{-6}/°C.$ or less. The term "regular petroleum coke" means a coke having a higher CTE value. The CTE values referred to in these definitions are with-grain CTE values. The CTE values are measured according to techiques well known in the art. A detailed description of a method for measuring CTE values is given in Technical Report WADD TR 61-72, Vo. XXVI (May 1, 1964) Air Force Materials Laboratory, Research and Technology Division, Air Force Systems Command, Wright Paterson Air Force Base, Ohio.

The term "anthracite coal" as used herein and in the appended claims means a coal having from about 86 to 98% fixed carbon and a volatile matter content of from about 2 to 14% by weight (both dry, mineral matter-free basis). A more detailed definition of this coal is given in ASTM D-388-77.

DESCRIPTION OF THE DRAWING

FIG. 3 is a graph showing the effect of coal particle size on the coefficient of thermal expansion (CTE) of graphite electrodes made with coal as a substitute for premium petroleum coke.

DESCRIPTION OF THE PREFERRED EMBODIMENTS

Figure 1:
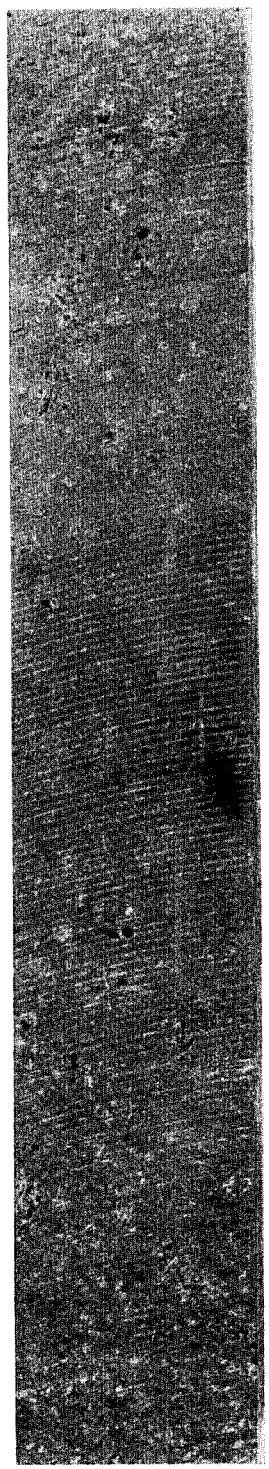
FIG. 1 is a photograph of a cut section of a high quality graphite electrode made using all-premium petroleum coke filler material.

High quality graphite electrodes in accordance with the present invention are made in a conventional manner by first preparing an electrode mixture containing a carbonaceous filler material such as premium petroleum coke particles and flour, and a binder, e.g., coal tar pitch, and then shaping or molding the mixture as by extrusion into the form of the desired electrode. The shaped electrode is baked at elevated temperatures and then graphitized. However, in accordance with the present invention, the electrode mix is formulated to include relatively large size particles of calcined anthracite coal in amounts of up to about 30% by weight of the total filler material. In actual practice, it is preferred to employ at least about 5% by weight of the coal particles in the electrode mix. If lesser amounts of the coal particles are used, the advantages of substituting coal for the coke particles may not be fully realized. Preferably, the coal particles are employed in amounts ranging from about 10 to 20% by weight of the total filler material. Bituminous and lignite coals, for example, contain high percentages of volatile matter and therefore are not suitable for use in the present invention.

The binder used in the electrode mix may be any conventional pitch binder. Generally, the pitch binder will be employed in an amount ranging from about 20 to 30% by weight of the total filler material.

The electrode mix also contains some very fine petroleum coke flour as a filler material. 55% flour may be used, for example. This flour is a collection of very fine petroleum coke particles, all of which pass through a No. 65 Tyler sieve and 55% of which pass through a No. 200 Tyler sieve. The mix may also contain a small amount of a lubricating oil, iron oxide ($Fe_2O_3$) particles and a conventional pitch plasticizer.

The particle size of the calcined coal used in the practice of the invention is critical. Graphite electrodes made with fine coal particles or flour show a substantial increase in CTE values as compared to electrodes made with coarse particle coal. In general, the average particle size of the coal particles used in the practice of the present invention will range from about 1.0 to 0.065 inch. In terms of Tyler sieve sizes, this corresponds to a range of from about 1 inch to about 10 mesh. However, a particle size range of from about 2 to about 10 mesh is preferred. An even more preferred range is from about 3 to 10 mesh. For purposes of this disclosure, coal particles of a size greater than about 3 mesh (e.g. about 1.0 to about 0.3 inch) shall be referred to as "large" particles.

In the case of 3/6 mesh particles mentioned earlier, for instance, the particles pass through a No. 3 Tyler sieve but do not pass through a No. 6 Tyler sieve. Ordinarily, the electrode mix is formulated with coke particles of several different sizes, e.g., 3/6, 6/10 and 10/20 mesh particles. The coal particles may be substituted for any one or all of the different particles size cokes, except the smaller size coke, e.g., 10/20 mesh particles, and coke flour.

The anthracite coal particles used in the electrode mix should be calcined at elevated temperatures. Any of the well known methods for calcining the coal may be employed. The calcining temperatures may range from between about 1000° C. and 2200° C. The coal particles may be calcined in Acheson or pot furnaces or gas calcined in rotary kilns, for example.

The electrode ingredients prepared in the above manner are throughly mixed in a conventional mixer for a period of time sufficient to assure that all the ingredients have been substantially uniformly distributed throughout the electrode mixture. The electrode mixture is then shaped to the form of desired electrode, e.g., cylindrical, usually by extruding the mix to predetermined lengths. The shaped or extruded electrodes are then baked at elevated temperatures of between about 700° C. and 1000° C. If desired, the baked electrodes may be impregnated with a liquid carbonaceous pitch material to fill the remaining pores or voids prior thee graphitization. It has been found that impregnation of the baked electrodes is highly desirable since in most cases the finished electrodes exhibit higher flexural strengths. After the baking operation, the electrodes are graphitized at temperatures of at least about 2500° C. by conventional techniques.

Thus, in accordance with the present invention, there is provided a finished or shaped graphite electrode for use in an electric arc furnace which is composed of an all-graphitized, particulate, pitch-bonded, petroleum coke matrix in which particles of anthracite coal are substantially uniformly distributed, the finished or shaped electrode being formed form a mixture containing petroleum coke particles and coal particles in an amount such that the coal particles constitute from about 5 to 30% by weight of the total filler material. The particles size of the coal particles should also be maintained in a range of from about 1 inch to 10 mesh and preferably from about 3 mesh to about 10 mesh.

Figure 2:
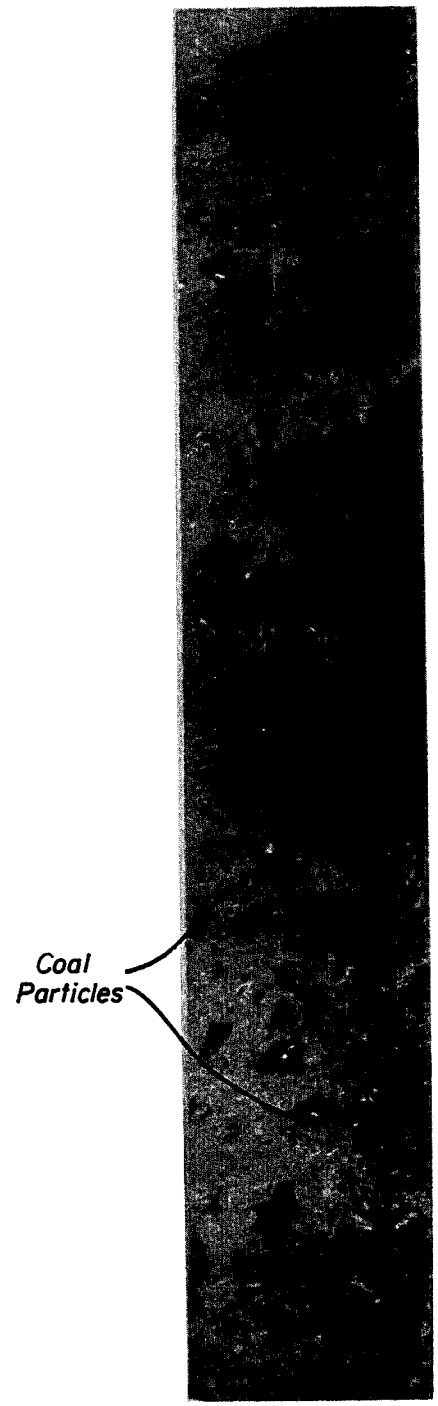
FIG. 2 is a photograph of a cut section of a high quality graphite electrode made in accordance with the present invention.

FIGS. 1 and 2 of the drawing show, respectively, photographs of a graphite electrode made from all premium petroleum coke particles and a graphite electrode made from premium petroleum coke and coal particles in accordance with the present invention. It will be seen by a comparison of the photographs in the two figures that the coal particles are quite readily distinguishable in the case of the graphite electrode of the present invention. It will be further seen that the coal particles are substantially uniformly distributed throughout the coke matrix in the electrode structure.

It has been found that the shaped graphite electrodes made in accordance with the present invention when compared with graphite electrodes made with all petroleum coke filler material, exhibit a surprisingly equivalent and, in some cases, lower with-grain CTE, virtually the same electrical resistance and only a slightly lower flexural strength. It is postulated that the reason why the with-grain CTE of the electrode containing both premium coke and coal particles is equivalent to or lower than that of the all-coke based stock is because the differential shrinkage between the coal particles and coke matrix during processing leads to internal porosity which can accommodate some of the thermal expansion during heating. Early experimental efforts to utilize an electrode made "completely" from coal filler material resulted in acceptable thermal performance; however, mechanical strength was so low that breakage problems were prevalent. By substituting coal for only a portion of the petroleum coke in the electrode mix, adequate mechanical strength can be maintained in the finished electrode.

The present invention will now be more fully described in the following examples.

EXAMPLE I

Three standard premium petroleum coke mixes were prepared with the following composition:

120 pounds of 3/6 mesh particles, 60 pounds of 6/10 mesh particles, 80 pounds of 10/20 mesh particles, 140 pounds of 55% flour, 104 pounds coal tar pitch, 8 pounds $Fe_2O_3$, and 5.4 pounds of lubricant and plasticizer. All particles sizes refer to Tyler sieve sizes as described hereinabove.

Coal substitutions in the standard mix were made using an anthracite coal herein designated "Type A." This anthracite coal has been calcined in an Acheson furnace to an average temperature of 2250° C., the individual coal particles reaching temperatures of between about 1400° C. and 3100° C.

Three mix compositions were made as follows:

(1) One mix was made in which the filler was entirely premium petroleum coke.

(2) One mix was made in which the 60 pounds of the 3/6 mesh particles were Type A coal, and the rest of the particles and flour were premium petroleum coke, this mix being referred to hereinafter as a mix with the 15% coal.

(3) One mix was made in which 120 pounds of the 3/6 mesh particles were Type A coal, and the rest of the particles and flour were premium petroleum coke. This mix is referred to thereinafter as a mix with 30% coal. The mixes were extruded, and the "green" electrodes were loaded into cylindrical metal saggers with finely ground petroleum coke as a packing material. The electrodes were then baked to 900° C. Some of the electrodes were also impregnated with coal tar pitch and then rebaked to 750° C. All the electrodes were graphitized to 2850° C. in an induction furnace while packed in finely ground petroleum coke. Table I below shows the properties of graphitized electrodes.

TABLE I

Properties of Graphite Electrodes Made From Mixes Containing Premium Coke and 3/6 Particles of Type A Coal

| Mix | Density (g/cm$^3$) | CTE (10$^{-6}$/°C.) WG | CTE (10$^{-6}$/°C.) AG | Resistivity ($\mu \Omega$ m) WG | Flexural Strength (psi) WG | Flexural Strength (psi) AG |
|---|---|---|---|---|---|---|
| UNIMPREGNATED | | | | | | |
| Premium coke - no coal | 1.60 | .59 | 1.65 | 7.3 | 1014 | 804 |
| 15% coal particles | 1.62 | .53 | 1.68 | 7.6 | 1015 | 632 |
| 30% coal particles | 1.61 | .51 | 1.78 | 8.1 | 913 | 447 |
| IMPREGNATED | | | | | | |
| Premium coke - no coal | 1.70 | .73 | 1.84 | 5.7 | 1747 | 1310 |
| 15% coal particles | 1.71 | .65 | 1.91 | 6.0 | 1630 | 1044 |
| 30% coal particles | 1.69 | .59 | 1.88 | 6.4 | 1374 | 822 |

WG — with-grain
AG — against-grain
All percentages are based on weight of total filler material.

It will be seen from Table I that the inclusion of the large coal particles in the electrode mix led to a slight reduction in the with-grain CTE and a slight increase in the against-grain CTE. The with-grain electrical resistivity increased slightly and the flexural strength in both grain directions tended to decrease as a result of the substitution of coal for coke in the mixes. The impregnated electrodes showed an improvement in both resistivity and flexural strength when compared to unimpregnated electrodes. The property level of both electrodes containing the coal particles is such that acceptable performance in an electric arc furnace can be expected.

EXAMPLE II

Seven mixes containing premium petroleum coke and coal tar pitch binder in the size fractions and weight proportions used in Example I were prepared. These mixtures were extruded to form electrodes and the electrodes were baked at 900° C., impregnated with petroleum pitch, rebaked to 750° C. and then graphitized at a temperature of 2850° C. The first mix, Mix 1, contained all premium petroleum coke and no coal particles (Type A). Mixes 2 and 3 contained 40 pounds and 80 pounds of the 3/6 mesh coke particles (10 to 20% of dry ingredients) replaced with 3/6 mesh anthracite coal particles hereinafter referred to as "Type B". This anthracite coal was pot calcined using high power inputs. The average heat treatment temperature of this coal is similar to that of Type A coal used in Example I. Mixes 4 and 5 contained 40 and 80 pounds of 3/6 mesh coke particles replaced with 3/6 mesh anthracite coal particles hereinafter referred to as "Type C". This anthracite coal was also pot calcined but at low power inputs. The average heat treatment temperature of this coal was approximately 1400° C. Mixes 6 and 7 contain 40 and 80 pounds of 3/6 mesh coke particles replaced with another type of anthracite coal hereinafter referred to as "Type D". This Type D coal was gas calcined in a rotary kiln. The average heat treatment temperature of the gas calcined coal was about 1200° C. to 1250° C. Properties of the electrodes made from each of the mixes indicated are listed in the Table II.

TABLE II

Properties of Graphite Electrodes Made From Mixes Containing Premium Coke and 3/6 Particles of Anthracite Coal Calcined to Different Temperatures

| | Mix | Density (g/cm$^3$) | CTE (10$^{-6}$/°C.) WG | CTE (10$^{-6}$/°C.) AG | Resistivity ($\mu \Omega$ m) WG | Flexural Strength (psi) WG | Flexural Strength (psi) AG |
|---|---|---|---|---|---|---|---|
| 1. | Premium coke - no coal | 1.70 | 0.98 | 1.90 | 6.5 | 1859 | 1603 |
| 2. | 10% Type B coal | 1.72 | 0.91 | 2.07 | 6.4 | 1995 | 1140 |
| 3. | 20% Type B coal | 1.72 | 0.75 | 1.88 | 6.6 | 1692 | 978 |
| 4. | 10% Type C coal | 1.73 | 0.97 | 2.22 | 6.1 | 1874 | 1222 |
| 5. | 20% Type C coal | 1.70 | 0.80 | 2.11 | 6.7 | 1585 | 997 |
| 6. | 10% Type D coal | 1.71 | 0.80 | 2.04 | 6.1 | 1937 | 1054 |
| 7. | 20 Type D coal | 1.69 | 0.81 | 2.19 | 6.3 | 1879 | 1194 |

WG — with-grain
AG — against-grain
All percentages are based on weight of total filler material.

It will be seen that the substitution of either of the three types of coal in the mix left the densities of the graphitized electrodes unchanged and the resistivities essentially the same. The flexural strengths decreased in the against-grain direction as a result of the coal substitutions. As was the case in Example I with Type A coal, substitutions of either of three types of coal led to equivalent or slightly reduced with-grain CTE values. The against-grain CTE values either remain unchanged or increased slightly. The anthracite coals used in Examples I and II, whose substitution for premium petroleum coke led to with-grain CTE values which were lower than those of all-coke electrodes, were heat treated by different methods and to average calcining temperatures which varied from approximately 1200° C. to 2200° C. It is evident from these experiments that while the calcination of the coal is beneficial, the properties of the finished electrodes are similar for a wide range of calcining temperatures.

EXAMPLE III

Two mixes were prepared using regular petroleum coke and coal tar pitch in the size fraction weight proportions used in Examples I and II. The first mix contains all regular petroleum coke and no coal particles. In the second mix, 80 pounds of the 3/6 mesh coke particles were replaced with 3/6 mesh Type C coal particles. The electrodes extruded from each mix were baked to temperatures of 900° C., impregnated with coal tar pitch, rebaked to 750° C. and then graphitized at temperatures of 2850° C. The properties of the electrodes are listed in Table III.

TABLE III

Properties of Graphite Electrodes made from Mixes Containing Regular Coke and 3/6 Particles of Type B Coal

| Mix | Density (g/cm³) | CTE (10⁻⁶/°C.) WG | CTE (10⁻⁶/°C.) AG | Resistivity (μ Ω m) WG | Flexural Strength (psi) WG | Flexural Strength (psi) AG |
|---|---|---|---|---|---|---|
| Regular Coke - No Coal | 1.76 | 1.74 | 2.45 | 7.70 | 2243 | 1808 |
| 20% Type B Coal | 1.68 | 1.48 | 2.44 | 7.48 | 1573 | 985 |

WG — with-grain
AG — against-grain
All percentages are based on weight of total filler material.

It will be seen from Table III that the effects of coal substitution on the physical properties of the graphite electrodes were similar to those of Example I where Type A coal substitutions were made to electrodes containing premium coke. Density was decreased slightly and resistivity was increased slightly by the coal substitution. However, strength was descreased considerably in both grain directions. The with-grain CTE value was reduced by $0.26 \times 10^{-6°}$ C. and the against-grain CTE value was equivalent to that of the all-coke electrodes made with regular petroleum coke.

EXAMPLE IV

The experiment illustrated in Example I where 3/6 mesh Type A coal was substituted for the 3/6 mesh premium coke particles was repeated except that the Type A coal substitutions were made in the smaller particles sizes and flour. Mixes were prepared using the size fraction and weight proportions in Examples I, II and III with premium petroleum coke and coal tar pitch. The first mix had the 6/10 mesh coke (60 pounds or 15% of coke weight) replaced with 6/10 mesh Type A coal. The second mix had the 10/20 mesh coke (80 pounds or 20% of the coke weight) replaced with 10/20 mesh Type A coal. The third and fourth mixes had 80 pounds (20%) and 140 pounds (35%) of coke flour replaced with Type A coal flour. Electrodes extruded from each mix were baked at temperatures of about 900° C., some of the electrodes were impregnated and rebaked while others were not. All electrodes were graphitized at a temperature of 2850° C. The properties of the electrodes prepared in this experiment are listed in Table IV along with the properties presented in the Example I for the control electrodes with no coal and for the electrodes with 15% and 30% 3/6 mesh Type A coal particles.

TABLE IV

Properties of Graphite Electrodes made from Mixes Containing Premium Coke and Different Size Particles of Type A Coal

| Mix | Density (g/cm³) | CTE (10⁻⁶/°C.) WG | CTE (10⁻⁶/°C.) AG | Resistivity (μ Ω m) WG | Flexural Strength (psi) WG | Flexural Strength (psi) AG |
|---|---|---|---|---|---|---|
| UNIMPREGNATED | | | | | | |
| No coal | 1.60 | .59 | 1.65 | 7.3 | 1014 | 804 |
| 15% 3/6 mesh coal | 1.62 | .53 | 1.68 | 7.6 | 1015 | 632 |
| 30% 3/6 mesh coal | 1.61 | .51 | 1.78 | 8.1 | 913 | 447 |
| 15% 6/10 mesh coal | 1.61 | .60 | 1.75 | 7.5 | 1066 | 617 |
| 20% 10/20 mesh coal | 1.60 | .64 | 1.74 | 7.9 | 940 | 588 |
| 20% coal flour | 1.59 | .65 | 1.83 | 8.3 | 927 | 544 |
| 35% coal flour | 1.58 | .87 | 1.94 | 9.4 | 1008 | 572 |
| IMPREGNATED | | | | | | |
| No coal | 1.70 | .73 | 1.84 | 5.7 | 1747 | 1310 |
| 15% 3/6 mesh coal | 1.71 | .65 | 1.91 | 6.0 | 1630 | 1044 |
| 30% 3/6 mesh coal | 1.69 | .59 | 1.88 | 6.4 | 1374 | 822 |
| 15% 6/10 mesh coal | 1.70 | .74 | 1.91 | 6.0 | 1666 | 1093 |
| 20% 10/20 mesh coal | 1.70 | .72 | 1.92 | 6.3 | 1695 | 1131 |
| 20% coal flour | 1.68 | .72 | 1.99 | 6.4 | 1492 | 968 |
| 35% coal flour | 1.68 | .96 | 2.10 | 7.05 | 1584 | 894 |

WG — with-grain
AG — against-grain
All percentages are based on weight of total filler material.

It will be seen from the results tabulated in Table IV that the particle size of the calcined anthracite coal particles is critical. For example, it will be noted that in the case of both the impregnated and unimpregnated electrodes, the with-grain coefficient of thermal expansion (CTE) exhibited for electrodes containing calcined anthracite coal particles in amounts of up to 30% by weight of the filler material is equal to or less than the CTE of the same graphite electrodes made with all premium petroleum coke (i.e., no coal) provided that coal particles of a size greater than about 10 mesh are employed. However, it is even more surprising to note that in those cases where the coal particles are fairly large, i.e., about 3/6 to 6/10 mesh particles, the CTE is actually substantially less than that of typical high quality graphite electrodes made from all premium petroleum coke.

In order to more clearly demonstrate this synergistic effect, data taken from Table IV is shown on the graph of FIG. 3. For comparison, a dotted line has been drawn from the CTE value (0.59) of an all-premium petroleum coke electrode to the CTE value (0.95) of an electrode made of 100% calcine coal. It will be noted that the CTE for each electrode made according to present invention is below this straight dotted line and more importantly that the CTE values for electrodes made with coal particles of a size greater than about 10 mesh are actually substantially lower than the CTE value for the all-premium petroleum coke electrode.

It will also be seen from Table IV that substitutions of 6/10 and 10/20 mesh coal particles left the density unchanged. The substitution of coal flour decreased the density slightly. Resistivity increased slightly with the 6/10 and 10/20 mesh coal particles substitutions and increased to a greater degree with the substitutions of coal flour. Strengh was decreased only slightly in the with-grain direction by 6/10 and 10/20 mesh coal substitutions but was decreased to a greater extent in the across-grain direction. The substitution of coal flour decreased the strength appreciably in both directions. The with-grain and against-grain CTE values for the electrodes containing coal were equivalent to those of all-coke electrodes for all but electrodes containing 35% coal flour.

EXAMPLE V

Four mixtures were prepared containing premium petroleum coke and coal tar pitch binder in size fractions and weight proportions similar to those used in Example I through IV. These mixtures were extruded to form electrodes and the electrodes were baked at 900° C., impregnated with coal tar pitch, rebaked to 750° C., and then graphitized at a temperature of 2850° C. The first and third mixes contained all premium petroleum coke and no coal particles. The second mix contained 100 lbs. (25% of the dry ingredients) of the petroleum coke replaced with "large" 2/3 mesh ($-\frac{1}{2}''/+\frac{1}{4}''$) anthracite coal particles which had been pot calcined using high power inputs similar to that of coal "Type B" in Example II (average temperature 2250° C.). The fourth mix contained 100 lbs. (25% of the dry ingredients) of the petroleum coke replaced with "large" 1 inch/2 mesh ($-1''/+\frac{1}{2}''$) anthracite coal particles that had been calcined in an induction furnace to an average temperature of 2200° C. Properties of the electrode made from each mix are listed in Table V.

TABLE V

Properties of Graphite Electrodes made from Mixes Containing Premium Coke and Large Anthracite Coal Particles

| | | CTE ($10^{-6}/°C$.) | | Resistivity ($\mu \Omega$ m) | Flexural Strength (psi) |
|---|---|---|---|---|---|
| Mix | Density (g/cm³) | WG | AG | WG | WG |
| 1. premium coke no coal | 1.704 | 0.76 | 1.72 | 5.69 | 1818 |
| 2. 25% 2/3 coal | 1.678 | 0.61 | 1.95 | 5.40 | 1387 |
| 3. premium coke - no coal | 1.684 | 0.89 | 1.85 | 7.09 | 1818 |
| 4. 25% 1"/2 mesh coal | 1.696 | 0.80 | 2.01 | 7.24 | 1777 |

WG — with-grain
AG — against-grain
All percentages are based on weight of total filler material.

The substitution of either 2/3 mesh coal or 1"/2 mesh coal for premium coke density either unchanged or reduced slightly. Resistivities were increased slightly, and flexural strengths were reduced. As was the case in the first four examples, the coal substitution led to low with-grain CTE values. In fact, the with-grain CTE values were reduced substantially in each case below the with-grain CTE values for the premium coke (no coal) electrodes similar to the CTE values for that small coal particle electrodes shown in FIG. 3. The against-grain CTE values were increased slightly. It is evident from these experiments that the properties of the finished electrodes are similar for coal of particle size considerably larger than 3 mesh.

Although the present invention has been described herein with particular reference to the manufacture of high quality graphite electrodes made with premium petroleum coke, it will be understood of course that the principles of the present invention are applicable to the manufacture of graphite electrodes made with regular pentroleum coke as well.

We claim:

1. In the manufacture of high quality graphite electrodes for use in electric arc furnaces wherein a mixture containing premium petroleum coke particles and a pitch binder is shaped to the form of the desired electrode, baked at carbonizing temperatures and then graphitized, the improvement comprising mixing together premium petroleum coke particles and particles of calcined anthracite coal as a filler material in a manner such as to form a substantially uniform mixture thereof, the amount of coal particles in said mixture constituuting from about 10 to 20% by weight of the total filler material, the coal particles having a particle size ranging from about 3 to about 10 mesh.

2. A shaped graphite electrode for use in an electric arc furnace composed of an all-graphitized, particulate, pitch-bonded petroleum coke matrix in which particles of calcined anthracite coal are substantially uniformly distributed, said electrode being formed from a mixture containing premium petroleum coke particles and calcined anthracite coal particles as the filler material and a carbonaceous pitch binder, the coal particles constituting from about 10 to 20% by weight of the total filler material and having a particle size ranging from about 3 to about 10 mesh and being further characterized by having the following properties measured with-grain: a coefficient of thermal expansion of less than about $0.6 \times 10^{-6}/°C$., a resistivity of less than about 8.0 micro ohm meters and a flexural strength of at least about 900 pounds per square inch.

3. As an article of manufacture, a shaped green carbonaceous electrode composed of a particulate, pitch-bonded, premium petroleum coke matrix in which particles of calcined anthracite coal are substantially uniformly distributed, the coal particles constituting from about 10 to 20% by weight of the combined petroleum coke and coal particles and having a particle size ranging from about 3 mesh to about 10 mesh.

* * * * *

UNITED STATES PATENT AND TRADEMARK OFFICE
CERTIFICATE OF CORRECTION

PATENT NO. : 4,534,951
DATED : August 13, 1985
INVENTOR(S) : James W. Kortovich; Eugene Micinski It is certified that error appears in the above—identified patent and that said Letters Patent is hereby corrected as shown below:

Col. 2, line 31, "techiques" should read -- techniques --.

Col. 3, line 56, "throughly" should read - thoroughly --; line 65, "thee" should read -- to --.

Col. 4, line 15, "particles" should read -- particle --; line 60, "particles" should read -- particle --.

Col. 5, line 11, "thereinafter" should read -- therein --.

Col. 7, line 59, "particles" should read -- particle --.

Col. 8, line 9, "particles" should read -- particle --.

Col. 9, line 58, insert the word "left" before the word "density".

Col. 10, line 7, the word "that" should read -- the --; line 19,"pentroleum" should read -- petroleum --.

Signed and Sealed this

First Day of April 1986

[SEAL]

Attest:

Attesting Officer

DONALD J. QUIGG

Commissioner of Patents and Trademarks